(12) United States Patent
Yamamoto

(10) Patent No.: US 7,099,048 B2
(45) Date of Patent: Aug. 29, 2006

(54) IMAGE REPRODUCING METHOD AND IMAGE REPRODUCING APPARATUS

(75) Inventor: Hiroyasu Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1057 days.

(21) Appl. No.: 10/108,721

(22) Filed: Mar. 29, 2002

(65) Prior Publication Data

US 2002/0149795 A1    Oct. 17, 2002

(30) Foreign Application Priority Data

Mar. 30, 2001   (JP)   .............................. 2001-098956

(51) Int. Cl.
*H04N 1/40* (2006.01)
(52) U.S. Cl. ...................... 358/3.26; 358/506; 358/527
(58) Field of Classification Search ................ 358/1.9, 358/3.26, 3.27, 506, 527, 487, 461, 463, 358/509, 475; 382/318, 319, 260, 274, 275
See application file for complete search history.

(56) References Cited

U.S. PATENT DOCUMENTS 5,461,440 A  *  10/1995  Toyoda et al. .............. 358/487
5,739,922 A  *  4/1998  Matama ...................... 358/527

FOREIGN PATENT DOCUMENTS

JP          58166876 A   *  10/1983

* cited by examiner

*Primary Examiner*—Scott A. Rogers
(74) *Attorney, Agent, or Firm*—Birch, Stewart, Kolasch & Birch, LLP

(57) ABSTRACT

An image reproducing method and apparatus for obtaining a prescan image having a low resolution by pre-scanning an image recorded on a film through a lens of a camera and then obtaining a fine scan image having a high resolution by fine scanning the above image and of outputting the image as a visible image by subjecting the fine scan image to predetermined digital image processing, is characterized by having preparing a decreased marginal illumination correction mask to the prescan image to correct decreased marginal illumination characteristics caused by the lens of the camera; and subjecting the fine scan image to a decreased marginal illumination correction by enlarging the prepared decreased marginal illumination correction mask to a size corresponding to an image size.

7 Claims, 5 Drawing Sheets

IMAGE REPRODUCING METHOD AND IMAGE REPRODUCING APPARATUS

BACKGROUND OF THE INVENTION

1. Field of the Invention

The present invention relates to an image processing apparatus for and an image processing method of subjecting image data, which is obtained from an image recorded through a photographing lens of a camera, to predetermined image processing to thereby arrange the resultant image data as output image data, and more particularly, to an image processing apparatus for and an image processing method of improving the quality of an image by applying a decreased marginal illumination quantity correction to the light whose quantity is decreased in the marginal portion of an image, which is caused when the image is recorded with a less expensive lens such as a film with a lens.

2. Related Background Art

Most of the images recorded on photographic films such as negatives and reversals (which are hereinafter referred to as "films") are conventionally printed onto light-sensitive materials (photographic papers) by a technique generally called "direct exposure" (analog exposure, areal exposure) in which the image on a film is projected onto the light-sensitive material for areal exposure (one spot exposure).

In contrast, recently, a printer which adopts digital exposure, that is, a digital photoprinter has recently been commercialized. In this "digital photoprinter", the image recorded on a film is read photoelectrically; the resultant image is converted into digital signals, which are subjected to various kinds of image processing and arranged as recording image data; and a light-sensitive material is scan exposed with recording light modulated according to the image data to thereby record an image (latent image) on the light-sensitive material; and a (finished) print, on which the image is reproduced, is produced.

According to the digital photoprinter, exposing conditions used in printing can be determined by subjecting an image to image data processing as digital image data. Thus, a print of high quality, which cannot be obtained by conventional direct exposure, can be obtained by appropriately subjecting the image data to a correction of washed-out highlight and dull-shadow of the image, which are caused when the image is recorded in backlight or with an electronic flash, to sharpness processing, and to a color and density failure correction, and the like. Further, the digital photoprinter can combine a plurality of images to a composite image, can divide a single image into segments, can combine characters to a composite character, and also can output a print that is freely edited and processed depending on a specific use.

Moreover, the digital photoprinter can not only output an image as a print but also supply image data to a computer, and the like and store it in a recording medium such as a floppy, and the like, whereby the image data can be used in various applications other than a photograph.

The digital photoprinter like this basically includes an image input apparatus that has a scanner (image reading apparatus) and an image processing apparatus, and an image output apparatus that has a printer (image recording apparatus) and a processor (development apparatus). The scanner photoelectrically reads the image recorded on a film; the image processing apparatus subjects the thus read image to image processing and arranges it as output image data (exposing conditions); the printer scan exposes a light-sensitive material according to image data output from the image input apparatus and records a latent image on the light-sensitive material; and the processor develops the thus exposed light-sensitive material and arranges it as a print.

The scanner supplies the reading light emitted from a light source to the film and obtains projecting light carrying the image recorded on the film, reads the image by imaging the projecting light on an image sensor such as a CCD sensor through an imaging lens and by photoelectrically converting the projecting light. Thereafter, the image is subjected to various kinds of processing, when necessary, and is supplied to the image processing apparatus as the image data (image data signals) of the film.

The image processing apparatus sets image processing conditions from the image data read with the scanner, subjects the image data to image processing according to the thus set conditions, and supplies the resultant image data to the printer as output image data (exposing conditions) for recording the image.

When the printer is an apparatus making use of, for example, scan exposure performed with a light beam, it modulates the light beam according to the image data supplied from the image processing apparatus, deflects the light beam in a main scan direction as well as transports the light-sensitive material in a sub-scan direction perpendicular to the main scan direction, thereby the latent image is formed on the light-sensitive material by exposing (printing) it with the light beam carrying the image. Then, the processor subjects the latent image to development processing, and the like according to the light-sensitive material so as to arrange the light-sensitive material as a print (photograph) on which the image recorded on the film is reproduced.

Incidentally, the quality of the image reproduced on the print is deteriorated by the reduction of marginal illumination (decreased quantity of marginal illumination), which is caused by the performance of a lens mounted on a camera, and lens aberrations such as magnification chromatic aberration, and distortion.

In particular, a lens-fitted photographic film package, a less expensive compact camera, and the like employ so-called single- and two-element lenses to reduce a lens cost to cope with the restriction in cost.

As a result, in the lens-fitted photographic film package and the less expensive compact camera, the quantity of light incident on a recording plane is reduced from the center of a lens toward the marginal portion thereof, which causes so-called marginal illumination reduction by which an image is made dark.

At this time, the phenomenon that the image is made dark in the marginal portion appears on a print as it is in a conventional areal exposure printer, from which a problem arises in that the quality of the image on the print is deteriorated.

In contrast, while various attempts have been made to improve the quality of the image on a print by subjecting image data arranged as digital signals to digital image processing by the digital photoprinter, there is a room for more improving the quality of the image on the print.

SUMMARY OF THE INVENTION

Accordingly, it is an object of the present invention, which was made in view of the conventional problem, to provide an image processing apparatus and an image processing method capable of improving the quality of an output image by effectively applying a decreased marginal illumination correction to marginal illumination whose quantity is decreased, which is caused by a photographing lens that deteriorates the quality of the image on a print, so as to digitally correct image data.

In order to attain the above object, according to a first aspect of the present invention, it is provided that an image reproducing method of obtaining a prescan image having a low resolution by pre-scanning an image recorded on a film through a lens of a camera and then obtaining a fine scan image having a high resolution by fine scanning the above image and of outputting the image as a visible image by subjecting the fine scan image to predetermined digital image processing, comprises the steps of: preparing a decreased marginal illumination correction mask to the prescan image to correct decreased marginal illumination characteristics caused by the lens of the camera; and subjecting the fine scan image to a decreased marginal illumination correction by enlarging the prepared decreased marginal illumination correction mask to a size corresponding to an image size.

Further, according to another aspect of the present invention, it is provided that the image reproducing method, wherein the prescan image is subjected to a decreased marginal illumination correction using the decreased marginal illumination correction mask prepared to the prescan image, and the prescan image having been subjected to the decreased marginal illumination correction is displayed.

Further, according to another aspect of the present invention, it is provided that the image reproducing method, wherein the prescan image is subjected to a decreased marginal illumination correction using the decreased marginal illumination correction mask prepared to the prescan image, and the prescan image having been subjected to the decreased marginal illumination correction is arranged as an index print image.

Further, according to another aspect of the present invention, it is provided that the image processing method wherein the image obtained by reducing the fine scan image is subjected to a decreased marginal illumination correction using the decreased marginal illumination correction mask prepared to the prescan image, and the image having been subjected to the decreased marginal illumination correction is arranged as an index print image.

Further, according to another aspect of the present invention, it is provided that the image reproducing method, wherein when images are recorded on the film in a state where at least two different print types designated thereto exist, each print type of the images are subjected to a decreased marginal illumination correction through a decreased marginal illumination correction mask prepared thereto.

Further, according to another aspect of the present invention, it is provided that the image reproducing method, wherein when images are recorded on the film in a state where at least two different print types designated thereto exist, only a decreased marginal illumination correction mask corresponding to a print type having a largest image area of the above print types is prepared as the above decreased marginal illumination correction mask, and the images having the prints types whose area is smaller than the largest image area is subjected to a decreased marginal illumination correction using the mask data of the portions, which correspond to the image regions of the print types having the smaller image area, of the prepared decreased marginal illumination correction mask.

In order to attain the above object, according to a second aspect of the present invention, it is provided that an image reproducing apparatus comprises: a scanner for fine scanning an image recorded on a film through a lens of a camera at a high resolution to obtain an output image and for pre-scanning the image at a low resolution prior to the fine scan; an image processing apparatus which subjects the image having been fine scanned to predetermined digital image processing; a printer which outputs the image having been subjected to the image processing as a visible image; a preparation apparatus which prepares a decreased marginal illumination correction mask to the prescan image obtained by the prescan to correct decreased marginal illumination characteristics caused by the lens of the camera; and a correction apparatus which subjects the fine scan image obtained by the fine scan to a decreased marginal illumination correction by enlarging the prepared decreased marginal illumination correction mask to a size corresponding to an image size.

BRIEF DESCRIPTION OF THE DRAWINGS

FIGS. 7A and 7B are views explaining a correction mask used in a decreased marginal illumination correction in this embodiment, wherein FIG. 7A is a plan view of the correction mask, and FIG. 7B is a sectional view of the correction mask taken along the line B—B of FIG. 7A.

DETAILED DESCRIPTION OF THE INVENTION

An image reproducing apparatus and an image reproducing method of the present invention will be described below in detail based on a preferable embodiment shown in the accompanying drawings.

Figure 1:
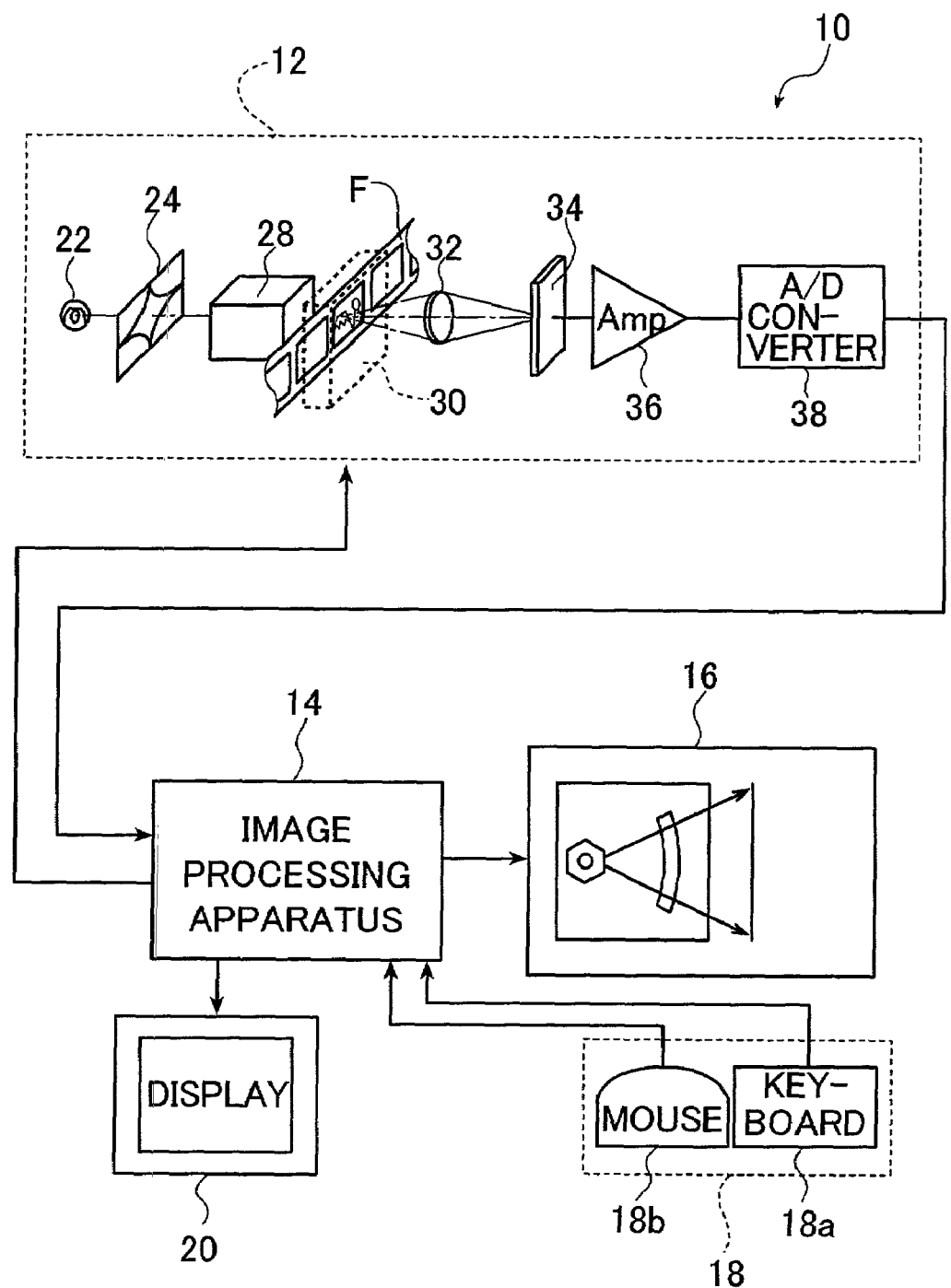
FIG. 1 is a block diagram showing an example of a digital photoprinter making use of an image processing apparatus according to a first embodiment of the present invention.

FIG. 1 is a block diagram showing the schematic arrangement of a digital photoprinter as an embodiment of the image reproducing apparatus of the present invention. The digital photoprinter (hereinafter, referred to as "photoprinter 10") shown in FIG. 1 is basically composed of a scanner (image reading apparatus) 12 for photoelectrically reading an image recorded on a film F, an image processing apparatus 14 for processing the image of image data (image information) having been read and for operating and controlling the photoprinter 10 as a whole, and a printer 16 for exposing a light-sensitive material (photographic paper) with a light beam modulated according to the image data delivered from the image processing apparatus 14, for subjecting the resultant latent image to development processing and for outputting the light-sensitive material as a (finished) print.

Connected to the image processing apparatus 14 are a manipulating unit 18 having a keyboard 18a and a mouse 18b for inputting (setting) various conditions, selecting and instructing a specific processing step and entering a command and so forth for effecting color/density correction and the like, as well as a display unit 20 for displaying the image read by the scanner 12, various manipulative commands and pictures for setting and registering various conditions.

The scanner 12 is an apparatus with which the images recorded on the film F or the like are read photoelectrically frame by frame. The scanner 12 includes a light source 22, a variable diaphragm 24, a diffuser box 28 with which the reading light incident on the film F is made uniform in the plane direction thereof, an imaging lens unit 32, an image sensor 34 having line CCD sensors corresponding to the reading of respective R (red), G (green), and B (blue) images, an amplifier 36, and an A/D (analog/digital) converter 38.

Further, in the photoprinter 10, dedicated carriers 30 are prepared which can be mounted on the main body of the scanner 12 in accordance with the types of films such as a film used in Advanced Photo System, a 135-sized negative (or reversal) film, etc., with the forms of films such as a strip and a slide, and the various types of the films can be handled and various processing steps can be carried out by the replacement of the carriers 30. An image (frame) recorded on a film and used to create a print is transported to and held at a predetermined reading position by one of the carriers 30.

The images, which are recorded on the film F, are red with the scanner 12 arranged as described above, the reading light, which is emitted from the light source 22 and the quantity of which is regulated by the variable diaphragm 24, is incident on the film F located at the predetermined position by the carrier 30 and passes therethrough, thereby projecting light carrying the images recorded on the film F can be obtained.

Figure 2:
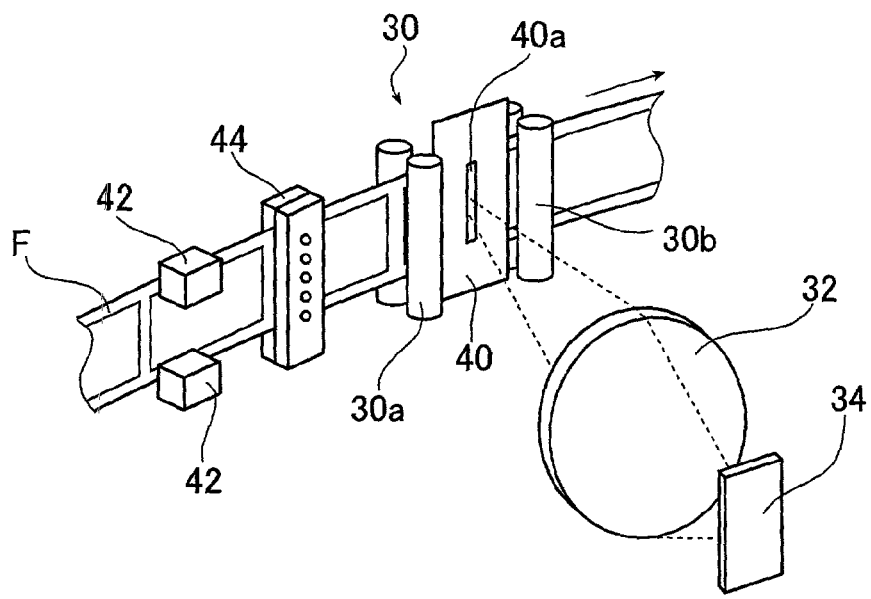
FIG. 2 is a schematic perspective view explaining a carrier mounted on the digital photoprinter shown in FIG. 1.

The carriers 30 corresponds to the film F (cartridge) of Advanced Photo System. As schematically shown in FIG. 2, the carrier 30 includes transport roller pairs 30a and 30b and a mask 40 having a slit 40a that is located in correspondence to the reading position and extends in a main scan direction so as to regulate the projecting light of the film F in a predetermined slit shape. The transport roller pairs 30a and 30b are disposed in a sub-scan direction (shown by an arrow in FIG. 2) across the reading position located therebetween, and transports the film F with the lengthwise direction thereof in coincidence with the sub-scan direction perpendicular to the direction in which the line CCD sensors of the image sensor 34 extend (main scan direction) while locating the film F at the predetermined reading position.

The reading light is incident on the film F while it is located at the reading position by the carrier 30 and is transported in the sub-scan direction. This operation results in that the film F is two-dimensionally slit scanned by the slit 40a extending in the main scan direction.

As is known well, a magnetic recording medium is formed on the film of Advanced Photo System, and various kinds of information is previously recorded on the magnetic recording medium. Further, various kinds of information is recorded on the magnetic recording medium by a camera, a development apparatus, and a carrier 30, and is read out, when necessary.

Figure 3:
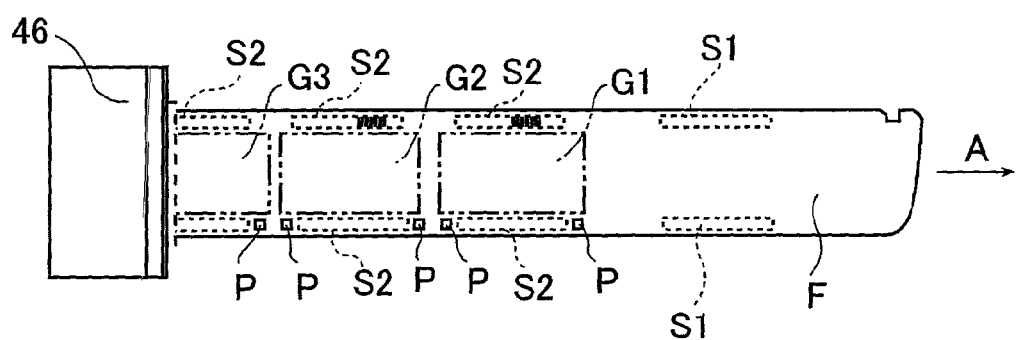
FIG. 3 is a schematic view of a film of Advanced Photo System.

More specifically, as conceptually shown in FIG. 3, the film F of Advanced Photo System has transparent magnetic recording mediums S (S1, S2) extending in a lengthwise direction (sub-scan direction) in the vicinities of both the ends thereof in a width direction (main scan direction). The magnetic recording mediums S1 are located in a predetermined region close to the leading end of the film F from a leading frame G1 in the drawing out direction (shown by an arrow A in FIG. 3) thereof from a cartridge and in a predetermined region close to the trailing end of the film F from a trailing end frame (not shown). Further, the magnetic recording mediums S2 are located in the regions corresponding to respective frames G. Information relating to the overall film F such as a cartridge ID, a type of a film, sensitivity, and a developing date is magnetically recorded on the magnetic recording medium S1 at the leading (trailing) end of the film F, whereas information of each frame of the film F such as a photographing date, a photographing lens, an aperture value employed in photographing, presence or absence of light emitted from an electronic flash in the photographing, and a title is recorded on the magnetic recording medium S2 of each frame. Further, information relating to a camera including information for identifying the characteristics of the photographing lens (lens ID) is recorded on one side of each magnetic recording medium S in the width direction thereof, and information relating to a laboratory is recorded on the other side thereof.

Note that reference numeral 46 in FIG. 3 denotes a cartridge main body in which the film F is accommodated, and reference symbol P denotes perforation holes through which the film F is transported (fed and rewound). An IC chip, for example, may be bonded on the cartridge 46 so as to record the lens ID information, and the like therein.

Magnetic heads 42, 42 are disposed on the carrier 30 of the film F of Advanced Photo System in correspondence to the both the magnetic recording mediums S so as to read out the information such as the lens ID information, and the like recorded thereon and to record necessary information thereon. Further, a code reader 44 is interposed between the magnetic heads 42 and the mask 40 to optically read bar codes such as DX code, expanded DX code, FMS code recorded on the film F Note that a reading apparatus for reading the barcodes recorded on the film is provided with any ordinary (film) carrier, in addition to the carrier 30 of Advanced Photo System.

Various types of information read by the magnetic heads 42 and the code reader 44 (the apparatus for obtaining photographing lens information, and the apparatus for obtaining film information) is supplied to predetermined sections such as the image processing apparatus 14, as necessary. The lens ID is supplied to a correction mask selecting section 78.

As described above, the reading light passes through the film F held by the carrier 30 and arranged as the projecting light carrying the image, and the projecting light is imaged on the light receiving plane of the image sensor 34 by the imaging lens unit 32.

Figure 4:
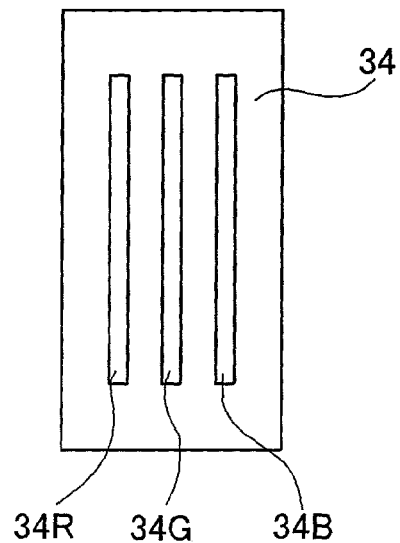
FIG. 4 is a schematic view of an image sensor of the digital photoprinter shown in FIG. 1.

As shown in FIG. 4, the image sensor 34 is arranged as a so-called three-line color CCD sensor having a line CCD sensor 34R for reading a R (red) image, a line CCD sensor 34G for reading a G (green) image, and a line CCD sensor 34B for reading a B (blue) image, and each line CCD sensor extends in the main scan direction, as described above. The projecting light of the film F is separated into three R (red), G (green), B (blue) primary colors and photoelectrically read.

The signals output from the image sensor 34 are amplified by the amplifier 36, are converted into digital signals by the A/D converter 38, and are supplied to the image processing apparatus 14.

The scanner 12 reads the image recorded on the film F twice. That is, the scanner 12 carries out prescan for reading the image at a low resolution and fine scan for obtaining the image data of an output image.

The prescan is carried out under prescan reading conditions which are set beforehand so that the scanner 12 can read the images of the entire film F without saturating charging ability of the image sensor 34. In contrast, the fine scan is carried out under the fine scan reading conditions which are set to each image (frame) from prescan data so that the image sensor 34 is saturated at a density which is somewhat lower than the minimum density of each image (frame).

The output signals in the prescan and the output signals in the fine scan are basically the same data except that they have a different resolution and a different output level.

Note that the scanner 12 constituting the image input apparatus of the embodiment is by no means limited to a type that relies upon the slit scan exposure described above, but areal exposure may be employed by which the entire surface of the image of one frame is read at a time.

In this case, an area CCD sensor, for example, is employed, an apparatus for inserting R (red), G (green), and B (blue) color filters is interposed between the light source and the film F, and the image recorded on the film is read with the area CCD sensor by sequentially inserting the R, G, and B color filters so that the image is read after it is separated into the three primary colors.

As described above, the digital signals output from the scanner 12 are supplied to the image processing apparatus 14.

Figure 5:
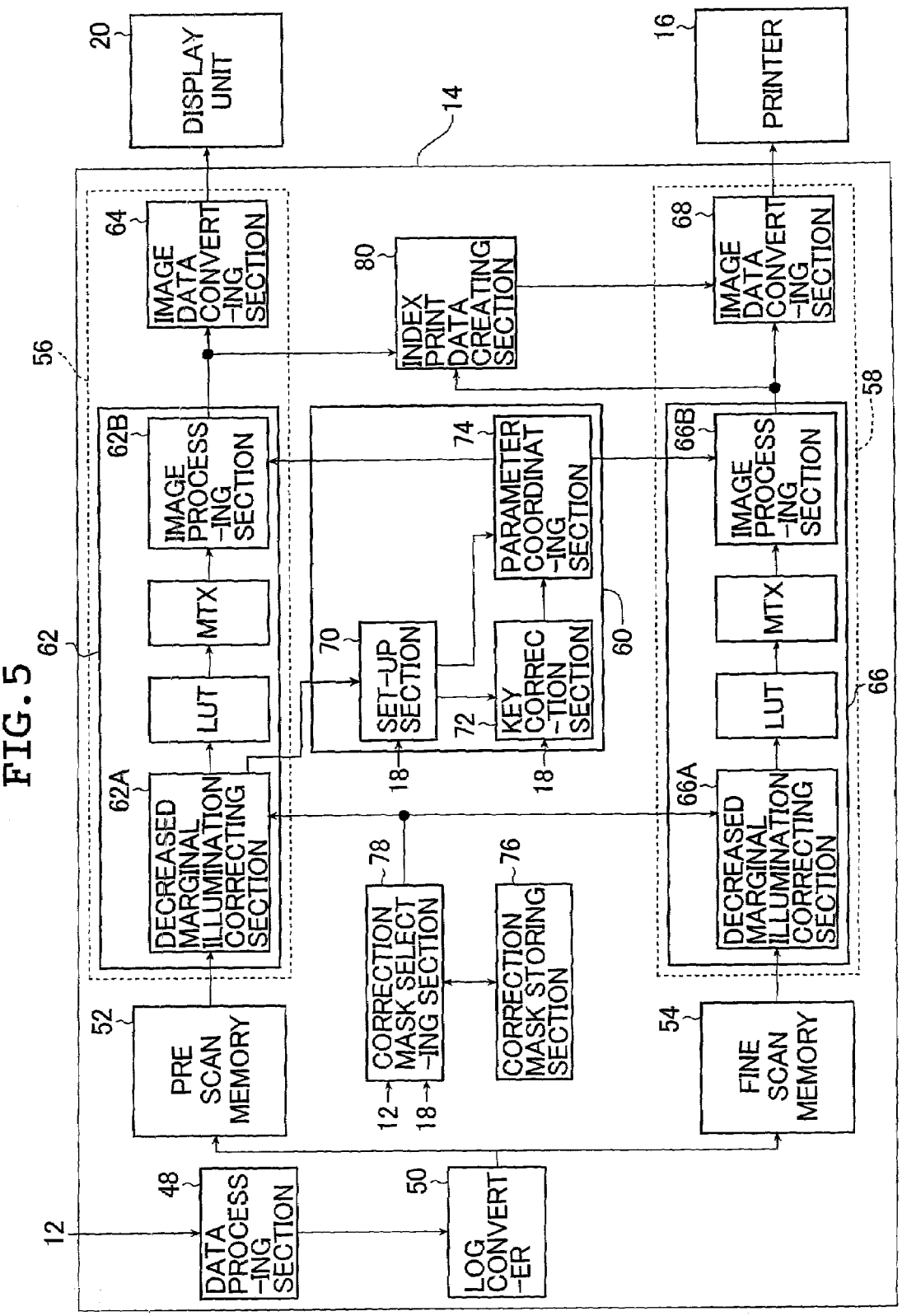
FIG. 5 is a block diagram of an example of an image processing apparatus of the digital photoprinter shown in FIG. 1.

FIG. 5 shows a block diagram of the image processing apparatus 14 according to a first embodiment of the present invention. The image processing apparatus 14 includes a data processing section 48, a Log converter 50, a prescan (frame) memory 52, a fine scan (frame) memory 54, a prescan processing section 56, a fine scan processing section 58, a condition setting section 60, a correction mask storing section 76, the correction mask selecting section 78, and an index print data creating section 80.

Note that FIG. 5 mainly shows only the sections relating to image processing. However, the image processing apparatus 14 is provided with a CPU for controlling and managing the photoprinter 10 including the processing apparatus 14 in its entirety, a memory for storing information necessary to the operation, and the like of the photoprinter 10, and so on, in addition to the above sections. Further, the manipulating unit 18 and the display unit 20 are connected to respective sections through the CPU, and the like (through a CPU bus).

The respective R (red), G (green), and B (blue) digital signals supplied from the scanner 12 are subjected to predetermined data processing such as a darkness correction, a defective pixel correction, and a shading correction in the data processing section 48, and then converted into digital image data (density data) by the Log converter 50. Then, prescan data is stored in the prescan memory 52 and fine scan data is stored in the fine scan memory 54, respectively.

The prescan data stored in the prescan memory 52 is read out by the prescan processing section 56 having an image data processing section 62 (hereinafter, referred to as "processing section 62") and an image data converting section 64. In contrast, the fine scan data stored in the fine scan memory 54 is read out by the fine scan processing section 58 having an image data processing section 66 (hereinafter, referred to as "processing section 66") and an image data converting section 68.

Exemplified as the image processing performed in the processing sections 62 and 66 are a color balance adjustment, a contrast correction (gradation processing), a brightness correction, dodging processing (compression/expansion of a density dynamic range), a saturation correction, sharpness processing, and the like. These processing steps are carried out by a known method by appropriately combining an arithmetic operation, processing using a look-up table, a matrix operation, processing using a filter, and the like. In the illustrated example, the color balance adjustment, the brightness correction, and the contrast correction are performed using the look-up table, and the saturation correction is performed by the matrix operation. Further, the sharpness processing and the dodging processing other than the above are performed in blocks 62B and 66B according to the operator's instruction, image data, and the like.

A peripheral reduced light correcting section 62A for prescan processing is disposed in front of the look-up table of the processing section 62, and a decreased marginal illumination correcting section 66A for fine scan processing is disposed in front of the look-up table of the processing section 66.

In this embodiment, the decreased marginal illumination correcting sections 62A and 66A correct the reduced amount of light in the marginal portion of the image recorded on the film F by image processing, when necessary, based on the information of the decreased marginal illumination characteristics corresponding to lens characteristics, thereby a print, on which the image of high quality that is not dark even in the marginal portion thereof is reproduced, can be stably output.

The image data converting section 68 converts the image data having been processed in the processing section 66 using, for example, a 3D (three-dimensional) look-up table or the like and outputs the image data to the printer 16 as image data that can be recorded thereby.

The image data converting section 64 thins out the image data having been processed in the processing section 62, when necessary, converts the resultant image data using a 3D (three-dimensional) look-up table or the like in the same way and outputs the image data to the display unit 20 as image data that can be displayed thereon.

The processing conditions in both the image data converting sections 68 and 64 are set in the condition setting section 60 which will be described later.

The condition setting section 60 sets the various processing conditions in the prescan processing section 56 and in the fine scan processing section 58.

The condition setting section 60 includes a setup section 70, a key correcting section 72, and a parameter coordinating section 74.

The setup section 70 sets the reading conditions in the fine scan using prescan data, and the like, and supplies them to the scanner 12. Further, the setup section 70 creates (calculates) the image processing conditions in the prescan processing section 56 and in the fine scan processing section 58, and supplies them to the parameter coordinating section 74.

Specifically, the setup section 70 reads out the prescan data from the prescan memory 52, creates a density histogram and calculates the characteristic amount of the image such as an average density, highlight (minimum density), shadow (maximum density), and the like from the prescan data, determines the reading conditions in the fine scan, and sets the image processing conditions such as a subject color balance adjustment, a gradation adjustment, and the like in the processing section 66 (62) in response to the instruction issued from the operator, when necessary.

The key correcting section 72 calculates the amounts of adjustment (for example, the amount of correction of the look-up tables, and the like) of the image processing conditions in response to the various instructions entered through the keys set to the keyboard 18a to adjust the density (brightness), color, contrast, sharpness, saturation, and the like and through the keyboard 18a, and supplies the amounts of adjustment to the parameter coordinating section 74.

The parameter coordinating section 74 receives the amounts of correction of the look-up tables calculated by the key correcting section 72, and the like and the image processing conditions set by the setup section 70, sets them to the processing section 62 of the prescan processing section 56 and to the processing section 66 of the fine scan processing section 58, and further corrects (adjusts) the image processing conditions set in the respective sections in accordance with the amounts of adjustment calculated by the key correcting section 72, or sets the image processing conditions again.

The correction mask storing section 76 is a section in which decreased marginal illumination correction masks for correcting decreased marginal illumination are stored. The correction mask selecting section 78 is a section for selecting a decreased marginal illumination correction mask from the correction mask storing section 76 using given lens characteristics (lens ID) and for preparing the thus selected decreased marginal illumination correction mask to correct decreased marginal illumination characteristics. The prepared decreased marginal illumination correction mask is supplied to the decreased marginal illumination correcting section 62A of the prescan processing section 62. Further, the index print data creating section 80 is a section for creating index print image data from the image data that is obtained by reducing the prescan data or the fine scan data by thinning out it and for supplying the image data to the printer 16.

Figure 6:
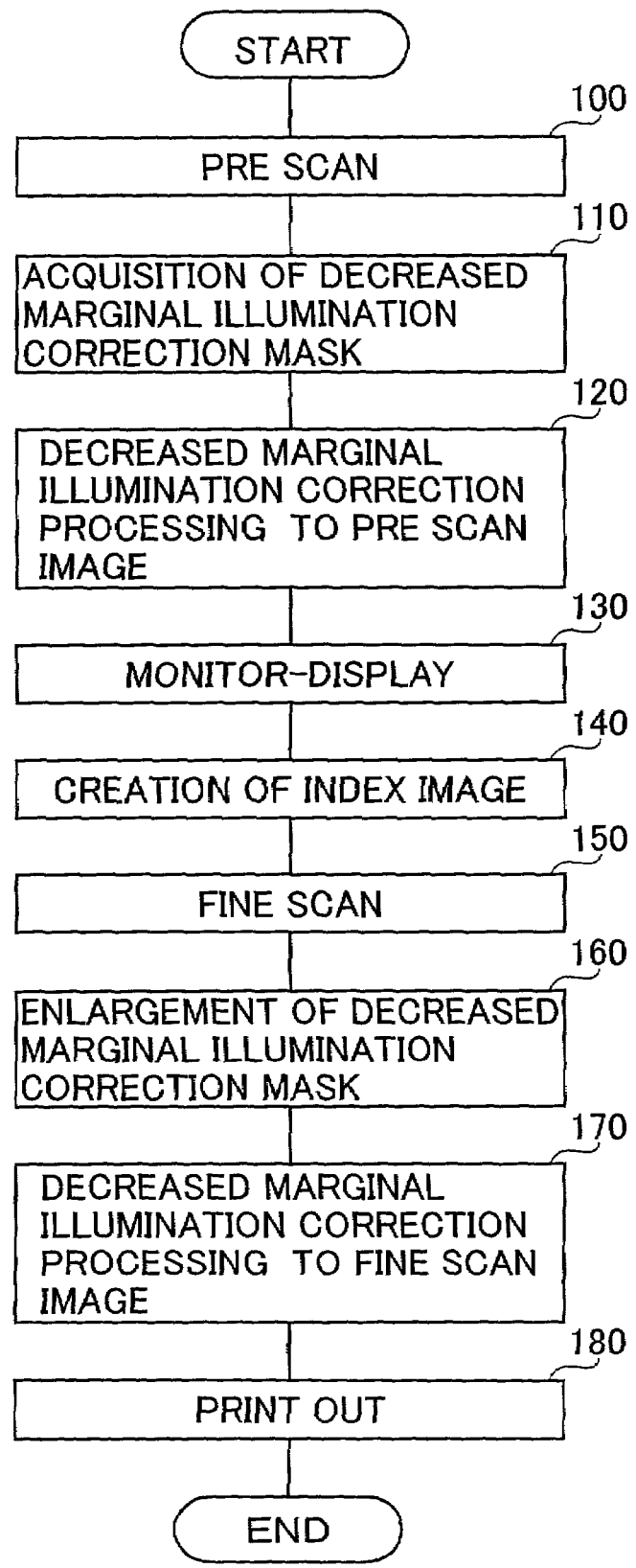
FIG. 6 is a flowchart shown operation of the embodiment of the present invention.

Operation of this embodiment will be explained below with reference to the flowchart of FIG. 6.

First, prescan is carried out at step 100.

The operator mounts the carrier 30 corresponding to the film F on the scanner 12, sets the film F (cartridge) at a predetermined position of the carrier 30, and inputs a necessary instruction such as a size of a print to be created, and then instructs to start the creation of the print.

With this instruction, the aperture value of the variable diaphragm 24 of the scanner 12 and the accumulation time of the image sensor (line CCD sensor) 34 are set according to the reading conditions in prescan. Subsequently, the carrier 30 draws out the film F from the cartridge, and transports it in the sub-scan direction at a speed according to the prescan, thereby the prescan is started. As described above, the prescan is carried out in such a manner that the film F is slit scanned at the predetermined reading position, as described above, projecting light is imaged on the image sensor 34, and the image recorded on the film F is separated to a R (red) image, a G (green) image, and a B (blue) image and photoelectrically read.

The output signals that are output from the image sensor 34 in the prescan are amplified by the amplifier 36, and supplied to the A/D converter 38 so as to be converted into digital signals. The digital signals are supplied to the image processing apparatus 14, are subjected to predetermined data processing in the data processing section 48, are converted into prescan data acting as digital image data in the Log converter 50, and the prescan data is stored in the prescan memory 52.

Further, when the film F is transported, the magnetic information recorded on the magnetic recording mediums S is read out by the magnetic heads 42, the barcodes such as DX code are read by the code reader 44, and necessary information is supplied to predetermined sections. In this embodiment, the type of the film and the lens characteristics ID information (lens ID) are obtained from the magnetic information recorded on the magnetic recording mediums S1 and are supplied to the correction mask selecting section 78.

Otherwise, the film ID may be recorded in the optical information of the film without being recorded in the magnetic information of the film and may be read from the optical information. Alternatively, the lens ID may be recorded in an IC memory or the like bonded on the film cartridge and may be read therefrom. Further, the operator may input the lens ID through the manipulating unit 18.

Note that, at this time, the aperture information of a lens employed in photographing may be recorded together with the lens ID and may be read.

Next, at step 110, a decreased marginal illumination correction mask is prepared to perform decreased marginal illumination correction processing.

As described above, the correction mask selecting section 78 receives the lens ID read from the magnetic information (or the optical information, or the like) of the film F with the scanner 12, searches the decreased marginal illumination correction mask corresponding to the marginal illumination characteristics of the lens having the lens ID in the correction mask storing section 76, and selects the correction mask. The thus selected decreased marginal illumination correction mask is supplied to the decreased marginal illumination correcting section 62A of the prescan processing section 62.

Figure 7A:
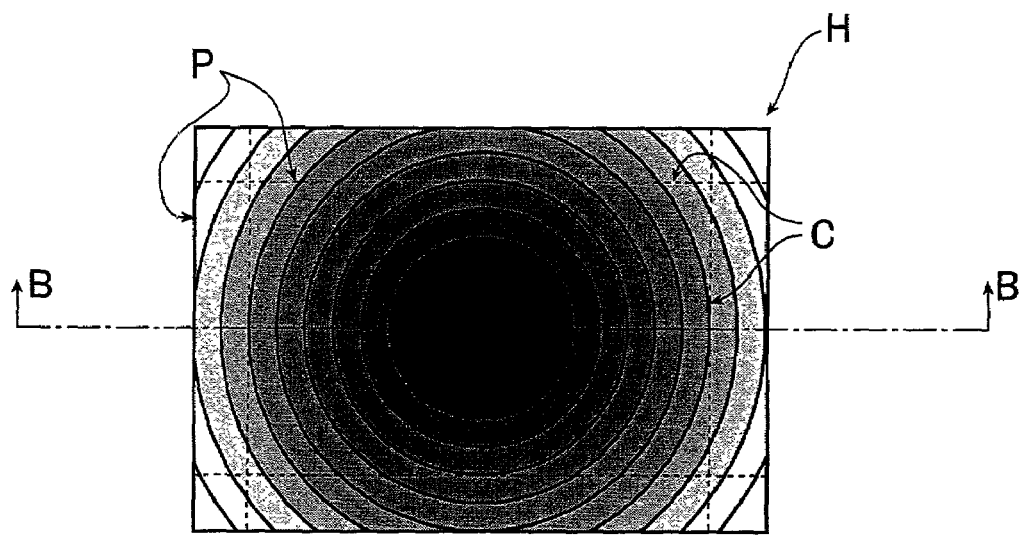
Figure 7B:

FIGS. 7A and 7B show an example of the decreased marginal illumination correction mask. FIGS. 7A and 7B conceptually show the correction mask in this embodiment, wherein FIG. 7A shows a plan view of the correction mask, and FIG. 7B shows a sectional view of the correction mask taken along the line B—B of FIG. 7A. The value in the longitudinal direction of FIG. 7B shows the intensity of a reduced light correction. That is, no correction is applied to the central portion of a recorded image because it is bright, and a correction is applied more intensely toward the peripheral darker portion of the image so that the brightness of the overall image can be adjusted uniformly. At this time, the inclination of the straight line, which shows the degree of correction, in FIG. 7B is determined in consideration of the decreased marginal illumination information of a lens, the aperture value of the lens employed in photographing, the type of the film, and the like.

As described above, this embodiment is arranged such that a decreased marginal illumination correction mask corresponding to a lens ID is stored, the lens ID is read from a film, and a decreased marginal illumination correction mask corresponding to the lens ID is obtained. However, the method of preparing the decreased marginal illumination correction mask is by no means limited thereto.

For example, the decreased marginal illumination characteristics information of the lens corresponding to the lens ID may be stored in a storing section, the correction mask selecting section 78 may select the decreased marginal illumination characteristics information corresponding to the lens using the lens ID, and may supply the information to the decreased marginal illumination correcting section 62A, which may create a decreased marginal illumination correction mask form the decreased marginal illumination characteristics information.

Alternatively, decreased marginal illumination characteristics information may be calculated from an image of a flat subject recorded through the lens of the camera or from an image including the decreased marginal illumination characteristics information of the lens, and a correction mask may be created therefrom without previously storing the correction masks or without obtaining the lens ID.

That is, the flat subject may be previously recorded on the leading or trailing end frame of a film through the lens of the camera at an appropriate exposure, or an image including the decreased marginal illumination characteristics information of the lens may be digitally exposed in the leading or trailing end frame of the film. Then, the image of the subject or the image including the information may be read with the scanner 12, and the decreased marginal illumination correcting section 62A may calculate the decreased marginal illumination characteristics information from the image data, thereby a correction mask as shown in FIG. 7 may be created.

Next, at step 120, a prescan image is subjected to decreased marginal illumination correction processing. The decreased marginal illumination correcting section 62A of the prescan processing section 62 reads out prescan data from the prescan memory 52, and carries out the decreased marginal illumination correction processing using the correction mask supplied from the correction mask selecting section 78.

The decreased marginal illumination correction processing may be carried out to each of R (red), G (green), and B (blue) images by preparing a correction mask for each of them. Otherwise, common correction processing may be carried out by preparing a correction mask common to the R (red), G (green), and B (blue) images.

The image data having been subjected to the decreased marginal illumination correction processing is supplied to the condition setting section 60, and image processing conditions are set therein. The setup section 70 of the condition setting section 60 receives the image data having been subjected to the decreased marginal illumination correction from the decreased marginal illumination correcting section 62A, performs the creation of a density histogram, the calculation of image characteristic amounts such as highlight, shadow, and the like, sets reading conditions in fine scan, and supplies them to the parameter coordinating section 74. The parameter coordinating section 74 having received the image processing conditions sets them to the predetermined portions of the prescan processing section 56 and the fine scan processing section 58.

Next, at step 130, the prescan image having been subjected to the decreased marginal illumination correction processing is displayed on the monitor (display unit 20). That is, the image having been subjected to the decreased marginal illumination correction processing is processed in the look-up table and the matrix and then subjected to necessary image processing such as sharpness processing and dodging processing in the block 62B, is converted in the image data converting section 64, and is displayed on the monitor (display unit 20).

The operator can change the intensity of the decreased marginal illumination correction, when necessary, while observing the image displayed on the monitor. When the operator instructs to change the intensity of the decreased marginal illumination correction through the manipulating unit 18, the decreased marginal illumination correcting section 62A of the prescan processing section 56 subjects the image to the decreased marginal illumination correction again using a changed correction mask, and the image is displayed again on the display unit 20 after it is subjected to predetermined processing.

Next, at step 140, an index print is created from the prescan image data having been subjected to the decreased marginal illumination correction processing.

The prescan image data, which has been subjected to the decreased marginal illumination correction processing and to the other predetermined image processing, is supplied to the index print data creating section 80 and is edited therein as index print image data. The index print image data is supplied to the printer 16 through the image data converting section 68 of the fine scan processing section 58 and is output therefrom as an index print.

At subsequent step 150, fine scan is carried out according to the reading conditions set by the condition setting section 60. The fine scan is carried out similarly to the prescan except that fine scan reading conditions, in which the reading conditions such as the aperture value of the variable diaphragm 24 are set, are employed, and fine scan data having been read is supplied to the fine scan memory 54. When the fine scan data is supplied to the fine scan memory 54, the decreased marginal illumination correcting section 66A reads out the fin scan data therefrom.

Next, at step 160, the decreased marginal illumination correcting section 66A of the fine scan processing section 66 receives a decreased marginal illumination correction mask from the correction mask selecting section 78 or from the decreased marginal illumination correcting section 62A of the prescan processing section 62, and enlarges the correction mask to a size corresponding to the image size of the fine scan image data.

At step 170, the decreased marginal illumination correcting section 66A subjects the fine scan data read from the fine scan memory 54 to decreased marginal illumination correction processing using the decreased marginal illumination correction mask whose size is enlarged to the image size.

The fine scan data having been subjected to the decreased marginal illumination correction is then processed by the look-up table and the matrix, is subjected to predetermined image processing in the block 66B, is converted in the image data converting section 68, and is supplied to the printer 16. Then, the fine scan data is output as a print at next step 180.

The index print is created using the prescan data in the example described above. However, an image obtained by reducing the fine scan image data through thinning-out processing may be used as an index print image after the image is subjected to decreased marginal illumination correction processing using the prescan image decreased marginal illumination correction mask. In this case, the fine scan decreased marginal illumination correcting section 66A reduces the fine scan data through the thinning-out processing, receives the decreased marginal illumination correction mask from the prescan decreased marginal illumination correcting section 62A, subjects the resultant reduced image to the decreased marginal illumination correction and then subjects it to the predetermined image processing, and supplies the resultant data to the index print data creating section 80.

Further, in actual image processing, recorded images, to which at least two print types are designated, are included in a mixed state in the image data of one film to be handled as one lot. The term "print type" is defined here such that when an image is to be output to a color paper having a width of 89 mm in, for example, Advanced Photo System (APS), the image is output as any of prints having a different print size, that is, as a C type print (standard type: 89 mm×127 mm), an H type print (hi-vision type: 89 mm×158 mm), or a P type print (panorama type: 89 mm×254 mm). Note that, in Advanced Photo System, all the images are recorded on a film in the same size (region), that is, they are recorded as a largest hi-vision type (H type). In contrast, when an image is printed in the hi-vision (H type), the entire region of the image shown by "H" in FIG. 7A is printed. However, in the standard type (C type), only the region of the image shown by "C" in FIG. 7A is printed; and in the panorama type (P type), only the region of it shown by "P" in the figure is printed.

Further, in a film of 135 size, an image recorded on the film has a different size (region) depending upon a print type, in which case the term "print type" may be defined as a recording format.

When a film, on which images having different print types are recorded in a mixed state, is handled, decreased marginal illumination correction masks having sizes as shown by "C", "H", and "P" in FIG. 7A may be prepared for the respective print types, and decreased marginal illumination correction processing may be carried out using a correction mask corresponding to each of the print types.

Further, when images having the three print types as shown in FIG. 7A are recorded on a film in a mixed state, only a correction mask corresponding to the H type having a largest image area may be prepared. Then, the images of the "C" and "P" types, which have an image area smaller than that of the "H" type, may be subjected to decreased marginal illumination correction processing using the correcting mask data that is extracted from H type correction mask data and covers only the regions shown by "C" and "P" in FIG. 7A.

As described above in detail, according to this embodiment, even a camera using a less expensive lens can create an image of high quality that has less decreased marginal illumination characteristics. Further, image data having been subjected to decreased marginal illumination correction processing is used to display an image on a monitor and to output an index print and an ordinary print, thereby a difference of qualities among them can be reduced.

Further, since the image data having been subjected to the decreased marginal illumination correction processing is displayed on the monitor, the operator can set the intensity of decreased marginal illumination correction while confirming the image data on the monitor. As a result, the intensity can be most appropriately set to each scene, each type of negatives, and each exposure area.

Furthermore, in a photographic film on which images of at least two different print types are recorded in a mixed state, a processing speed can be increased by preparing only one type of a decreased marginal illumination correction mask (only an "H" type mask when the images are, for example, of "C", "H", and "P" types) and by performing decreased marginal illumination correction to the images of the types other than the "H" type using only the necessary regions of the prepared correction mask. For example, when fine scan processing is performed through hardware processing, it is sufficient to design the hardware processing as described above. At this time, it is not necessary to set mask data to each print type.

While the image reproducing apparatus and the image reproducing method of the present invention have been described above in detail, the present invention is by no means limited to the above embodiment and it is needless to say that various improvements and modifications can be made within the range which does not depart from the gist of the present invention.

As described above, according to the present invention, an image of high quality having less decreased marginal illumination characteristics can be created by effectively performing decreased marginal illumination correction even if the image is recorded by a camera using a less expensive lens, i.e. a relatively cheap lens.

What is claimed is:

1. An image reproducing method of obtaining a prescan image having a low resolution by pre-scanning an image recorded on a film through a lens of a camera and then obtaining a fine scan image having a high resolution by fine scanning the above image and of outputting the image as a visible image by subjecting the fine scan image to predetermined digital image processing, comprising the steps of:

preparing a decreased marginal illumination correction mask to the prescan image to correct decreased marginal illumination characteristics caused by the lens of the camera; and subjecting the fine scan image to a decreased marginal illumination correction by enlarging the prepared decreased marginal illumination correction mask to a size corresponding to an image size.

2. The image reproducing method according to claim 1, wherein the prescan image is subjected to a decreased marginal illumination correction using the decreased marginal illumination correction mask prepared to the prescan image, and the prescan image having been subjected to the decreased marginal illumination correction is displayed.

3. The image reproducing method according to claim 1, wherein the prescan image is subjected to a decreased marginal illumination correction using the decreased marginal illumination correction mask prepared to the prescan image, and the prescan image having been subjected to the decreased marginal illumination correction is arranged as an index print image.

4. The image processing method according to claim 1, wherein the image obtained by reducing the fine scan image is subjected to a decreased marginal illumination correction using the decreased marginal illumination correction mask prepared to the prescan image, and the image having been subjected to the decreased marginal illumination correction is arranged as an index print image.

5. The image reproducing method according to claim 1, wherein when images are recorded on the film in a state where at least two different print types designated thereto exist, each print type of the images are subjected to a decreased marginal illumination correction through a decreased marginal illumination correction mask prepared thereto.

6. The image reproducing method according to claim 1, wherein when images are recorded on the film in a state where at least two different print types designated thereto exist, only a decreased marginal illumination correction mask corresponding to a print type having a largest image area of the above print types is prepared as the above decreased marginal illumination correction mask, and the images having the prints types whose area is smaller than the largest image area is subjected to a decreased marginal illumination correction using the mask data of the portions, which correspond to the image regions of the print types having the smaller image area, of the prepared decreased marginal illumination correction mask.

7. An image reproducing apparatus comprising:

a scanner for fine scanning an image recorded on a film through a lens of a camera at a high resolution to obtain an output image and for pre-scanning the image at a low resolution prior to the fine scan;

an image processing apparatus which subjects the image having been fine scanned to predetermined digital image processing;

a printer which outputs the image having been subjected to the image processing as a visible image;

a preparation apparatus which prepares a decreased marginal illumination correction mask to the prescan image obtained by the prescan to correct decreased marginal illumination characteristics caused by the lens of the camera; and a correction apparatus which subjects the fine scan image obtained by the fine scan to a decreased marginal illumination correction by enlarging the prepared decreased marginal illumination correction mask to a size corresponding to an image size.

* * * * *